United States Patent
Amemiya et al.

(10) Patent No.: US 11,165,884 B1
(45) Date of Patent: Nov. 2, 2021

(54) DATA COLLECTION DEVICE AND DATA COLLECTION METHOD

(71) Applicant: FUJITSU LIMITED, Kawasaki (JP)

(72) Inventors: Kouichirou Amemiya, Kawasaki (JP); Kento Ikkaku, Kawasaki (JP); Miho Kawano, Hamamatsu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/224,268

(22) Filed: Apr. 7, 2021

(30) Foreign Application Priority Data

Jun. 8, 2020 (JP) .............................. JP2020-099479

(51) Int. Cl.
  *H04W 72/04* (2009.01)
  *H04L 29/08* (2006.01)
  *H04L 12/26* (2006.01)

(52) U.S. Cl.
  CPC .......... *H04L 67/32* (2013.01); *H04L 43/0852* (2013.01)

(58) Field of Classification Search
  None
  See application file for complete search history.

(56) References Cited

U.S. PATENT DOCUMENTS

| | | | |
|---|---|---|---|
| 9,363,333 B2* | 6/2016 | Gibbon | H04L 67/325 |
| 2014/0113600 A1* | 4/2014 | El Gamal | H04W 28/02 |
| | | | 455/414.3 |
| 2015/0146697 A1* | 5/2015 | Gibbon | H04W 4/029 |
| | | | 370/336 |

FOREIGN PATENT DOCUMENTS

| | | |
|---|---|---|
| JP | 2006-079488 A | 3/2006 |
| JP | 2008-199381 A | 8/2008 |
| WO | 02/100023 A2 | 12/2002 |
| WO | 2017/024005 A1 | 2/2017 |
| WO | 2020/091949 A1 | 5/2020 |

OTHER PUBLICATIONS

Extended European Search Report dated Aug. 9, 2021, issued in counterpart EP Application No. 211675301. (7 pages).

* cited by examiner

*Primary Examiner* — Natisha D Cox
(74) *Attorney, Agent, or Firm* — Westerman, Hattori, Daniels & Adrian, LLP

(57) ABSTRACT

A data collection device includes a memory and a processor coupled to the memory and the processor configured to acquire, for a plurality of data transmission requests, first predicted values of a delay from transmission of the respective data transmission requests to a start of reception of data and second predicted values of a throughput regarding the reception of the data, classify the plurality of data transmission requests into groups based on first dispersion of the first predicted values and second dispersion of the second predicted values, and determine transmission timings of the respective data transmission requests in a unit of the group.

9 Claims, 15 Drawing Sheets

FIG. 5

| REQUEST ID |
| --- |
| VEHICLE ID |
| DATA ID |
| DATA SIZE |
| REQUEST GENERATION DATE AND TIME |
| COLLECTION TIME LIMIT |

FIG. 6

| VEHICLE ID | DATE AND TIME | POSITIONAL INFORMATION (LATITUDE AND LONGITUDE) |
|---|---|---|
| ... | ... | ... |
| ... | ... | ... |
| ... | ... | ... |
| : | : | : |

| VEHICLE ID | POSITIONAL INFORMATION (LATITUDE AND LONGITUDE) | TIME BAND | DELAY | THROUGHPUT |
|---|---|---|---|---|
| ... | ... | ... | ... | ... |
| ... | ... | ... | ... | ... |
| : | : | : | : | : |

| GROUP ID | TRANSMISSION START DATE AND TIME | MEMBER SET |
|---|---|---|
| ... | ... | ... |
| ... | ... | ... |
| : | : | : |

DATA COLLECTION DEVICE AND DATA COLLECTION METHOD

CROSS-REFERENCE TO RELATED APPLICATION

This application is based upon and claims the benefit of priority of the prior Japanese Patent Application No. 2020-99479, filed on Jun. 8, 2020, the entire contents of which are incorporated herein by reference.

FIELD

The embodiment discussed herein is related to a data collection device and a data collection method.

BACKGROUND

There is a computer system that collects data (video data or the like) generated by a plurality of distributed devices (in-vehicle camera or the like) in response to a request from a certain service. When receiving a collection request from the service, the computer system acquires the data by requesting a data transmission source (device) to transmit needed data and transmits the data to the service.

Japanese Laid-open Patent Publication No. 2006-079488 and Japanese Laid-open Patent Publication No. 2008-199381 are disclosed as related art.

SUMMARY

According to an aspect of the embodiment, a data collection device includes a memory and a processor coupled to the memory and the processor configured to acquire, for a plurality of data transmission requests, first predicted values of a delay from transmission of the respective data transmission requests to a start of reception of data and second predicted values of a throughput regarding the reception of the data, classify the plurality of data transmission requests into groups based on first dispersion of the first predicted values and second dispersion of the second predicted values, and determine transmission timings of the respective data transmission requests in a unit of the group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an exemplary configuration of a collection request;

FIG. 6 is a diagram illustrating an exemplary configuration of a positional information storage unit;

FIG. 7 is a diagram illustrating an exemplary configuration of a communication information storage unit;

FIG. 9 is a diagram illustrating an exemplary configuration of a schedule storage unit;

DESCRIPTION OF EMBODIMENT

A delay and a throughput from issuance of the data transmission request to the device to the transmission of the data from the device fluctuate depending on a device performance and a network environment. As a result, even when the requests are periodically issued to the device, there is a possibility that concentration of data reception causes a network congestion.

Figure 1:
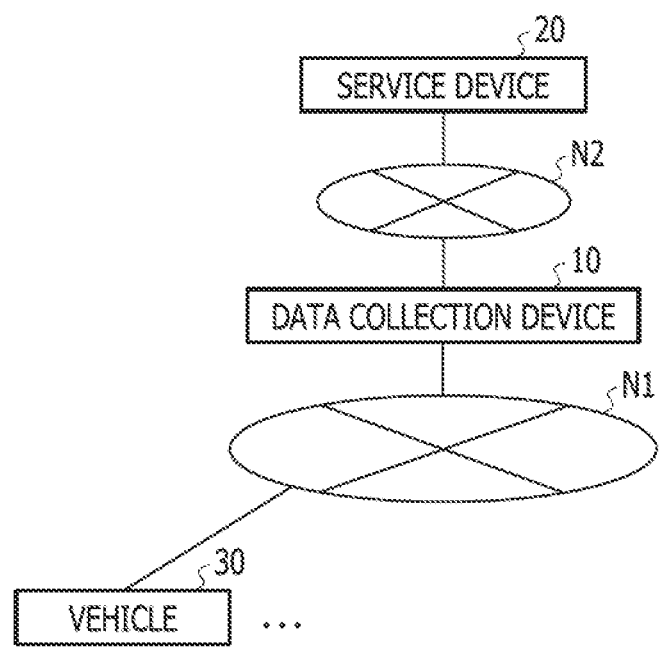
FIG. 1 is a diagram illustrating an exemplary system configuration according to an embodiment.

Hereinafter, an embodiment will be described with reference to the drawings. FIG. 1 is a diagram illustrating an exemplary system configuration according to the embodiment. In FIG. 1, a data collection device 10 is coupled to one or more service devices 20 via a network N2 such as the Internet. The data collection device 10 is also coupled to a plurality of vehicles 30 via a network N1. The network N1 may include a wireless section.

The service device 20 includes one or more computers (information processing devices) that provide a predetermined service using data (hereinafter, referred to as "vehicle data") that is generated by the vehicle 30 (or in-vehicle camera mounted on vehicle 30 or the like) and collected by the data collection device 10. An example of the vehicle data is data including video data. In this case, examples of the predetermined service include machine learning regarding automatic driving, a service related to automobile insurances, generation of map information, or the like. The service device 20 transmits a vehicle data collection request to the data collection device 10 at an arbitrary timing.

The data collection device 10 includes one or more computers that collect the vehicle data from each vehicle 30 in response to the collection request from the service device 20. The data collection device 10 transmits the collected vehicle data (or processed data of the vehicle data) to the service device 20.

The vehicle 30 is an example of a device that is a generation source and a transmission source of the vehicle data to be collected by the data collection device 10. Because each vehicle 30 moves, the plurality of vehicles 30 are dispersedly located at a plurality of places.

Figure 2:
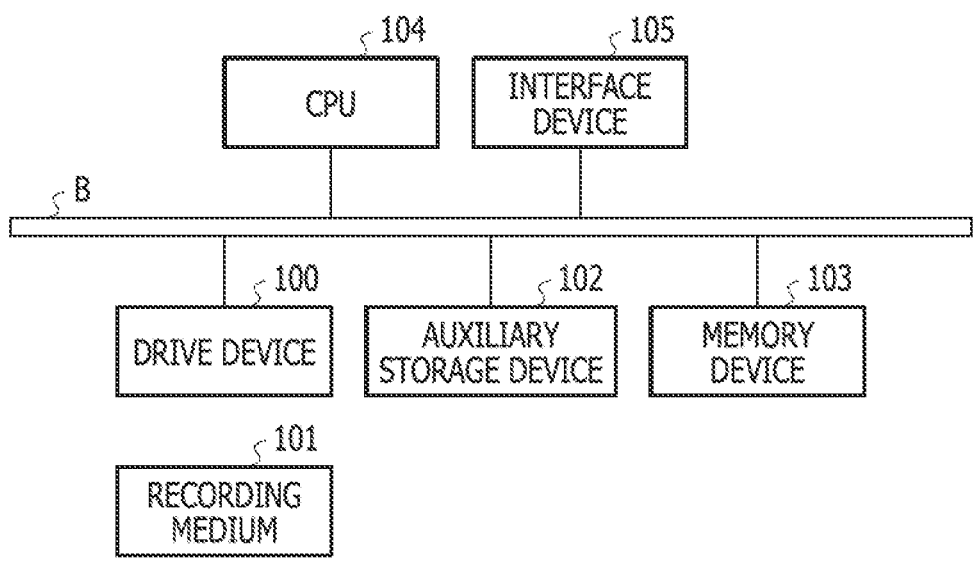
FIG. 2 is a diagram illustrating an exemplary hardware configuration of a data collection device according to the embodiment.

FIG. 2 is a diagram illustrating an exemplary hardware configuration of the data collection device 10 according to the embodiment. The data collection device 10 in FIG. 2 includes a drive device 100, an auxiliary storage device 102, a memory device 103, a CPU 104, an interface device 105, and the like, that are mutually coupled by a bus B.

A program that implements processing by the data collection device 10 is provided by a recording medium 101. The recording medium 101 recording the program is set in the drive device 100, and then the program is installed in the auxiliary storage device 102 from the recording medium 101 via the drive device 100. However, the program does not have to be necessarily installed from the recording medium 101, and the program may be downloaded from another computer via the network. The auxiliary storage device 102 stores the installed program and also stores files, data, and the like that are needed.

In a case where an instruction to activate the program is given, the program is read from the auxiliary storage device 102 and stored in the memory device 103. The CPU 104 executes a function of the data collection device 10 according to the program stored in the memory device 103. The interface device 105 is used as an interface for connecting to the network.

Examples of the recording medium 101 include a portable recording medium such as a compact disc read only memory (CD-ROM), a digital versatile disc (DVD), or a universal serial bus (USB) memory. Examples of the auxiliary storage device 102 include a hard disk drive (HDD), a flash memory, or the like. Both the recording medium 101 and the auxiliary storage device 102 correspond to a computer-readable recording medium.

Figure 3:
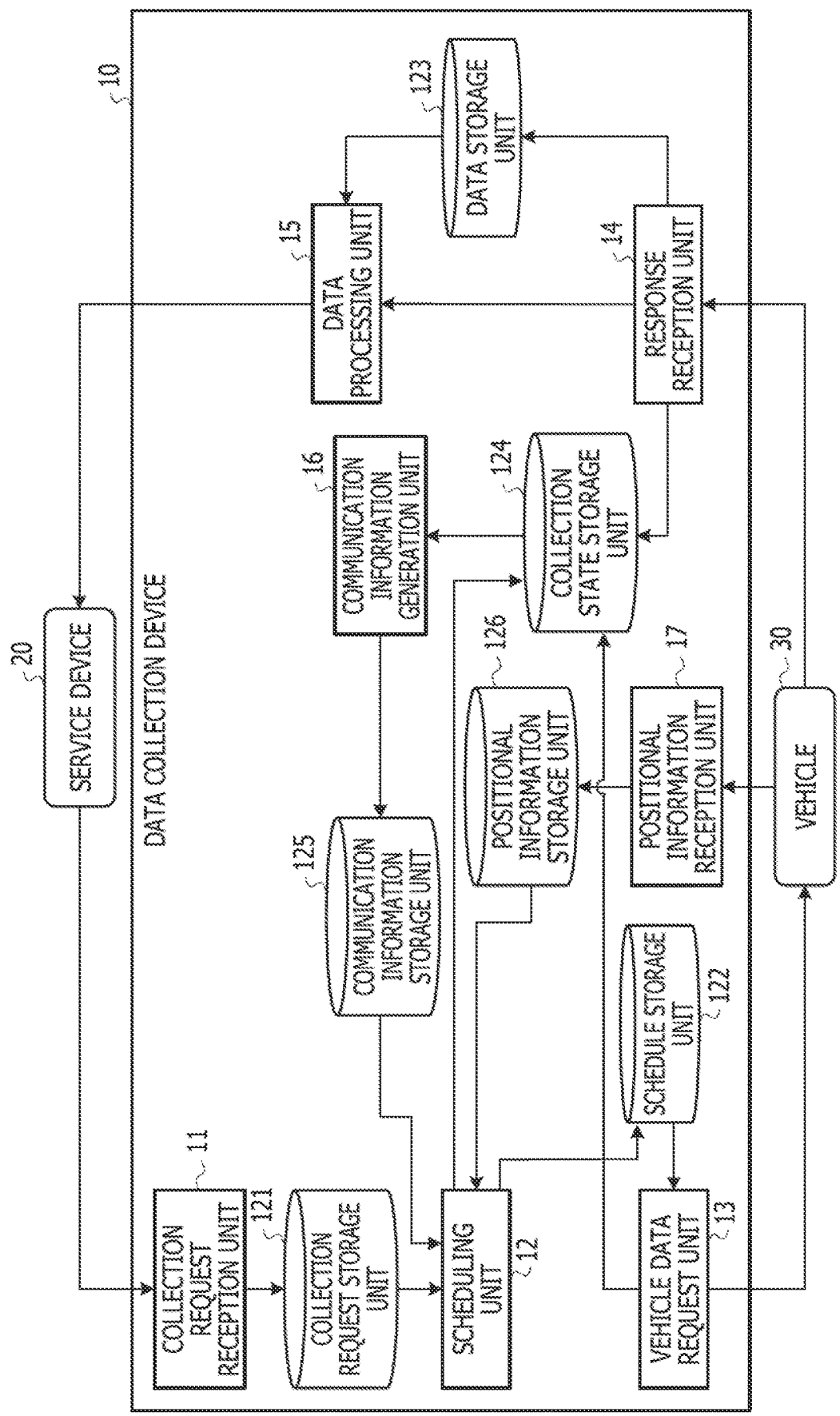
FIG. 3 is a diagram illustrating an exemplary functional configuration of the data collection device according to the embodiment.

FIG. 3 is a diagram illustrating an exemplary functional configuration of the data collection device 10 according to the embodiment. In FIG. 3, the data collection device 10 includes a collection request reception unit 11, a scheduling unit 12, a vehicle data request unit 13, a response reception unit 14, a data processing unit 15, a communication information generation unit 16, a positional information reception unit 17, or the like. Each of these units is implemented by processing that one or more programs installed in the data collection device 10 cause the CPU 104 to execute. The data collection device 10 further uses storage units such as a collection request storage unit 121, a schedule storage unit 122, a data storage unit 123, a collection state storage unit 124, a communication information storage unit 125, a positional information storage unit 126, or the like. Each of these storage units may be implemented, for example, by using a storage device or the like that is coupled to the memory device 103, the auxiliary storage device 102, or the data collection device 10 via a network.

The collection request reception unit 11 receives the collection request of the vehicle data transmitted from the service device 20 and stores the collection request in the collection request storage unit 121. The collection request includes, for example, identification information of the vehicle 30 (hereinafter, referred to as "vehicle ID") of which the vehicle data is to be collected. The collection request reception unit 11 records the received collection request in the collection request storage unit 121.

The scheduling unit 12 schedules (determine) transmission timings of transmission requests of vehicle data (hereinafter, simply referred to as "vehicle data transmission requests") to the vehicle 30 according to a set of one or more collection requests (hereinafter, referred to as "collection request set") recorded in the collection request storage unit 121 in a period from the previous timing to the current timing, at a plurality of timings such as periodical timings. In the present embodiment, the collection request corresponds to the vehicle data transmission request on a one-to-one basis. Therefore, the collection request is equivalent to the vehicle data transmission request.

At the time of scheduling, the scheduling unit 12 acquires a predicted value of a delay and a predicted value of a throughput for each collection request included in the collection request set and clusters the collection request set and classifies the collection request set into a plurality of groups (hereinafter, referred to as "collection group") on the basis of these predicted values. The scheduling unit 12 performs clustering so that dispersion of the predicted values of the delay and dispersion of the predicted values of the throughput of the collection requests belonging to each collection group are equal to or less than respective thresholds. The scheduling unit 12 performs scheduling in a collection group unit (one collection group is assumed as a bundle of collection requests). Therefore, the transmission timings of the respective collection requests belonging to the same collection group are the same. A result of the scheduling in a collection group unit (hereinafter, referred to as "schedule information") is recorded in the schedule storage unit 122. In other words, one piece of schedule information is recorded in the schedule storage unit 122 for one collection group.

The delay of the collection request indicates a time delay from the transmission of the vehicle data transmission request to a time when the vehicle 30 starts to respond (transmission of vehicle data). The throughput indicates a throughput regarding vehicle data reception from the vehicle 30. The respective predicted values of the delay and the throughput are based on actual values of a delay and a throughput at the time when the vehicle data is collected from the vehicle 30 in the past, that are stored in the communication information storage unit 125.

The vehicle data request unit 13 transmits the vehicle data transmission request to the vehicle 30 that is a target of the collection request on the basis of the schedule information recorded in the schedule storage unit 122.

The response reception unit 14 receives the vehicle data transmitted from the vehicle 30, which is a transmission target of the vehicle data transmission request, as a response and records the vehicle data in the data storage unit 123. The response reception unit 14 also records information indicating each timing of the transmission of the vehicle data transmission request, the start of the reception of the vehicle data, end of the reception of the vehicle data, or the like in the collection state storage unit 124.

The data processing unit 15 transmits the vehicle data recorded in the data storage unit 123 to the service device 20 that is the transmission source of the vehicle data collection request. In a case where a predetermined process is requested in the collection request, the data processing unit 15 executes processing for applying the predetermined process on the vehicle data related to the collection request.

The communication information generation unit 16 generates information including the actual values of the delay and the throughput or the like for each vehicle 30 on the basis of the information stored in the collection state storage unit 124 and records the information in the communication information storage unit 125.

The positional information reception unit 17 receives positional information of the vehicle 30 from each vehicle 30 at a plurality of timings such as periodic timings and records the received positional information in the positional information storage unit 126.

Figure 4:
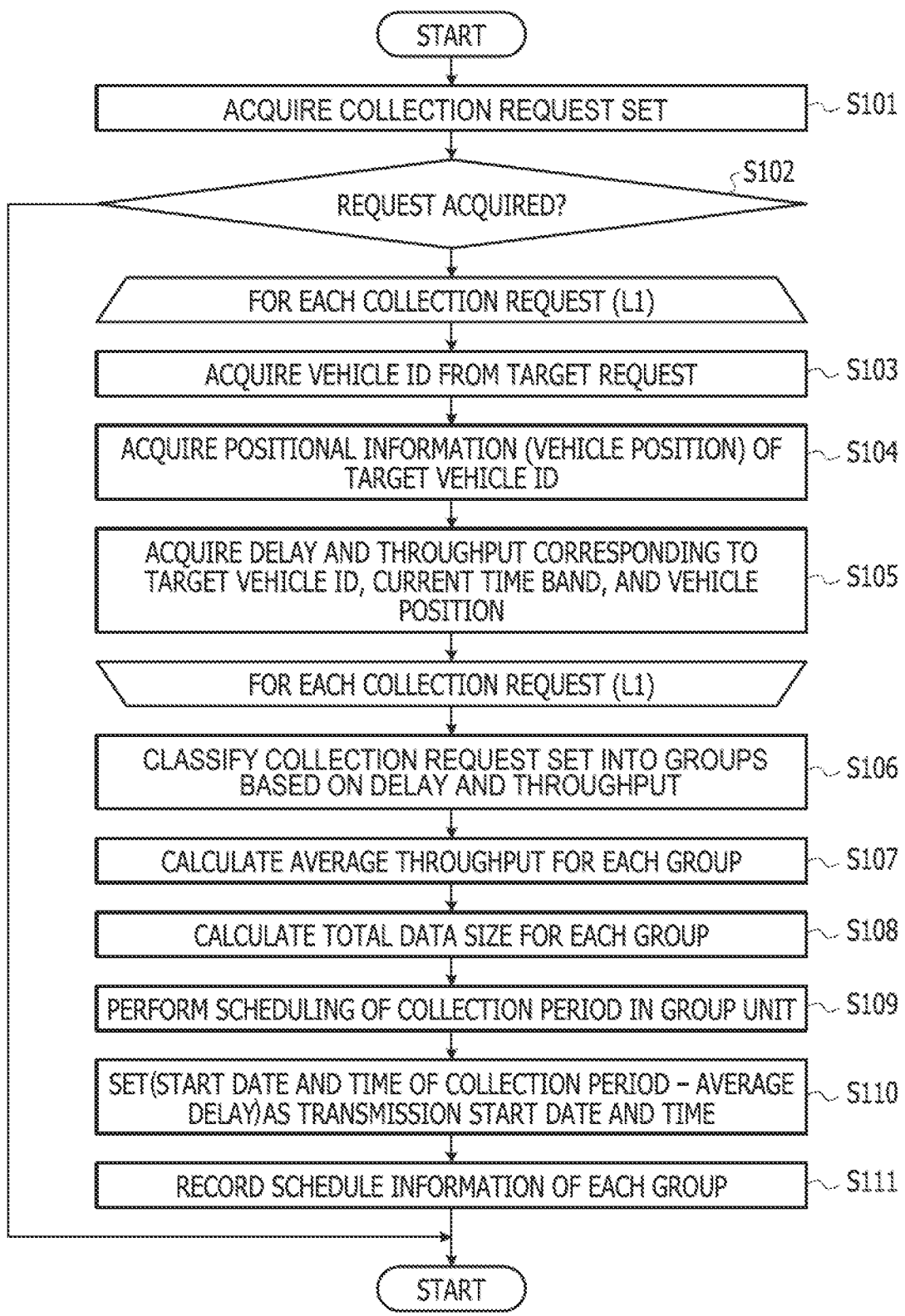
FIG. 4 is a flowchart illustrating an example of a processing procedure executed by the data collection device in response to a vehicle data collection request.

Hereinafter, a processing procedure executed by the data collection device 10 will be described. FIG. 4 is a flowchart illustrating an example of a processing procedure executed by the data collection device 10 in response to a vehicle data collection request. The processing procedure in FIG. 4 is repeatedly executed at a plurality of timings, for example, periodic timings or the like. A period from previous execution of the processing procedure to current execution of the processing procedure is referred to as a "period T1" below.

In step S101, the scheduling unit 12 acquires a set of collection requests (collection request set) received by the collection request reception unit 11 during the period T1 from the collection request storage unit 121 (S101). The acquired collection request is deleted from the collection request storage unit 121.

FIG. 5 is a diagram illustrating an exemplary configuration of a collection request. As illustrated in FIG. 5, the collection request includes a request ID, a vehicle ID, a data ID, a data size, a request generation date and time, a collection time limit, or the like. The request ID is identification information that is uniquely assigned to each collection request. The vehicle ID is identification information of a vehicle 30 of which vehicle data is to be collected (hereinafter, referred to as "target vehicle 30"). The data ID is identification information of the vehicle data collected from the target vehicle 30. The request generation date and time is a date and time when the collection request is generated. The collection time limit is information indicating a collection time limit of the vehicle data. The collection time limit, for example, may be specified based on an elapsed time (for example, "five minutes" or the like) from the request generation date and time or may be specified based on an absolute value (date and time or the like).

In a case where one or more collection requests are not acquired (in other words, in a case where collection request storage unit 121 is empty) (NO in S102), loop processing L1 and subsequent processing are not executed. In a case where the one or more collection requests are acquired (YES in S102), the scheduling unit 12 executes the loop processing L1 (S103 to S105) for each acquired collection request. The collection request that is a processing target in the loop processing L1 is referred to as a "target request" below.

In step S103, the scheduling unit 12 acquires a vehicle ID (hereinafter, referred to as "target vehicle ID") from the target request. Subsequently, the scheduling unit 12 acquires positional information corresponding to the target vehicle ID (in other words, positional information of target vehicle 30) from the positional information storage unit 126 (S104).

FIG. 6 is a diagram illustrating an exemplary configuration of the positional information storage unit 126. As illustrated in FIG. 6, the positional information storage unit 126 stores, for example, the positional information of the vehicle 30 (for example, information indicating geographical position such as latitude and longitude), which is periodically transmitted from each vehicle 30, in association with the vehicle ID and a date and time.

The date and time is a date and time when the positional information is received (transmission date and time from vehicle 30). The positional information is positional information of the vehicle 30 related to the vehicle ID at the date and time. The positional information may be measured by a GPS function or the like of the vehicle 30. Note that the positional information storage unit 126 stores a record for each vehicle 30. In other words, each record stored in the positional information storage unit 126 includes positional information that is most recently received from each vehicle 30. Therefore, the scheduling unit 12 uses positional information corresponding to the target vehicle ID as positional information indicating a current position of the target vehicle 30.

Subsequently, the scheduling unit 12 acquires communication information (delay and throughput) corresponding to the target vehicle ID, the current time band, and the positional information of the target vehicle 30 (hereinafter, referred to as "target vehicle positional information") from the communication information storage unit 125 (S105). Note that the current time band is, for example, a period, to which a current date and time belongs, of a period distinguished by the month, the day of the week, and the hourly time period. For example, in a case where the current date and time is "3/11 (Wednesday) 18:32", "March, Wednesday, 18:00 to 18:59" is set as the current time band. However, the time band does not have to be distinguished by the month, the day of the week, and the hourly time period.

FIG. 7 is a diagram illustrating an exemplary configuration of the communication information storage unit 125. As illustrated in FIG. 7, the communication information storage unit 125 stores a delay and a throughput for each combination of the vehicle ID, the positional information, and the time band. In other words, even in a case of the same vehicle ID, when the positional information or the time band differs, the delay and the throughput are stored in a different record. As will be described later, data stored in the communication information storage unit 125 is generated on the basis of the past results. Note that the positional information is, for example, the latitude and longitude of the upper left vertex of each mesh divided into 50 m squares. The time band is a period distinguished by the month, the day of the week, and the hourly time period. The delay is statistical information regarding a delay in the vehicle data received in the time band, among the vehicle data received in the past, and having the vehicle ID and the positional information. The throughput is statistical information of the throughput regarding the reception. In the present embodiment, an example will be described in which respective average values of the delay and the throughput are used as the statistical information of the delay and the statistical information of the throughput. However, other statistical information such as a maximum value, a minimum value, or a median value may be used.

In step S105, the scheduling unit 12 acquires a delay and a throughput of a record related to a vehicle ID, positional information, and a time band that respectively match the target vehicle ID, the target vehicle positional information, and the current time band among the records stored in the communication information storage unit 125, as predicted values of a delay and a throughput, respectively, for the target request. In a case where there is no record that matches the target vehicle positional information (record including positional information corresponding to mesh to which the position indicated by the target vehicle positional information belongs), a delay and a throughput may be acquired from a record that includes positional information closest to the target positional information among the records that match the target vehicle ID and the current time band. Similarly, in a case where there is no record that matches the current time band, a delay and a throughput may be acquired from a record related to a time band closest to the current time band among the records that match the target vehicle ID and the target vehicle positional information.

When the loop processing L1 is executed for all the collection requests, the respective predicted values of the delay and the throughput for each collection request are acquired. Hereinafter, the predicted value of the delay for the collection request is simply referred to as a "delay", and the predicted value of the throughput for the collection request is simply referred to as a "throughput".

Subsequently, the scheduling unit 12 clusters the collection request set on the basis of two parameters including the delay and the throughput and classifies the collection request set into a plurality of collection groups (S106).

Figure 8:
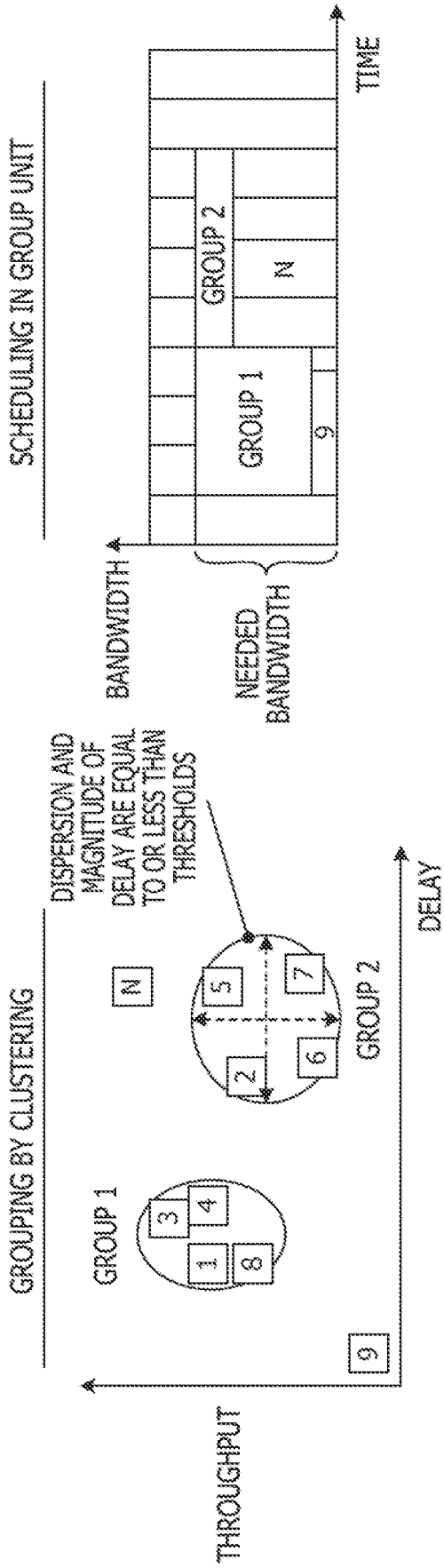
FIGS. 8A and 8B are diagrams illustrating scheduling of the collection request.

FIGS. 8A and 8B are diagrams illustrating scheduling of the collection request. In step S106, clustering is performed as illustrated in FIG. 8A. At this time, the scheduling unit 12 performs clustering so that dispersion of the delay of each collection group is equal to or less than a threshold th1 and dispersion of the throughput is equal to or less than a threshold th2. In the example in FIG. 8A, an example is illustrated in which four collection requests 1, 3, 4, and 8 are classified into one group (group 1), four collection requests 2, 5, 6, and 7 are classified into one group (group 2), and each of collection requests 9 and N forms an independent group.

Subsequently, the scheduling unit 12 calculates, for each collection group, an average value of the throughputs (average throughput) acquired in step S105 for the collection requests belonging to the collection group (S107). Subsequently, the scheduling unit 12 calculates, for each collection group, a total of data sizes (total data size) of the collection requests belonging to the collection group (S108).

Subsequently, the scheduling unit 12 performs scheduling (determination) of a collection period of the vehicle data regarding each collection request in a collection group unit (S109). In other words, each collection group is regarded as one unit of scheduling (target of scheduling), and scheduling of the collection period is performed. Here, the collection period indicates a period from a start timepoint to an end timepoint of the reception of the vehicle data.

For example, the scheduling unit 12 calculates the collection period so as to minimize a needed bandwidth (maximum bandwidth) using an optimization algorithm such as two-dimensional Bin packing as illustrated in FIG. 8B. In FIG. 8B, a rectangular area corresponding to a certain collection group corresponds to a total data size of the collection group, a width of the rectangle corresponds to a collection period, and a height of the rectangle corresponds to a bandwidth. In the optimization algorithm, an average delay of the collection group and the earliest time limit from among collection time limits of the respective collection requests belonging to the collection group are used as constraint conditions for each collection group. Specifically, for example, a collection period of a certain collection group is limited to a time after a time point elapsed from a certain time point (for example, current time) by the average delay of the collection group. This means that the left end of the rectangle corresponding to the collection group in FIG. 8B is limited to a time on and after the time point. Furthermore, the earliest time limit of the collection time period of each collection request belonging to the collection group is set to a time limit when the collection period of the collection group ends. This means that the right end of the rectangle corresponding to the collection group in FIG. 8B is limited to a time on and before the time limit. Note that FIG. 8B illustrates an example of a result of the scheduling.

Subsequently, the scheduling unit 12 sets a date and time obtained by subtracting the average delay of the collection group from the start time of the collection period calculated for the collection group in step S109 (in other words, date and time before the start date and time by the average delay) for each collection group as the transmission start date and time of the vehicle data transmission request in response to each collection request belonging to the collection group (S110). According to the above, scheduling in consideration of the delay is performed.

Subsequently, the scheduling unit 12 records the schedule information of each collection group in the schedule storage unit 122 (S111).

Figure 9:
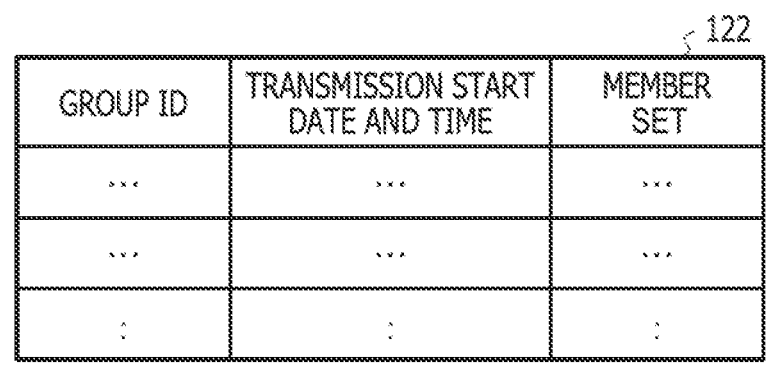

FIG. 9 is a diagram illustrating an exemplary configuration of the schedule storage unit 122. As illustrated in FIG. 9, the schedule storage unit 122 stores a group ID, a transmission start date and time, a member set, or the like for each collection group.

The group ID is identification information of the collection group. The transmission start date and time is a date and time when the transmission of the vehicle data transmission request is started according to the collection request set belonging to the collection group. The member set is a set of the collection requests belonging to the collection group.

Note that the schedule storage unit 122 may store records in ascending order of the transmission start date and time.

Figure 10:
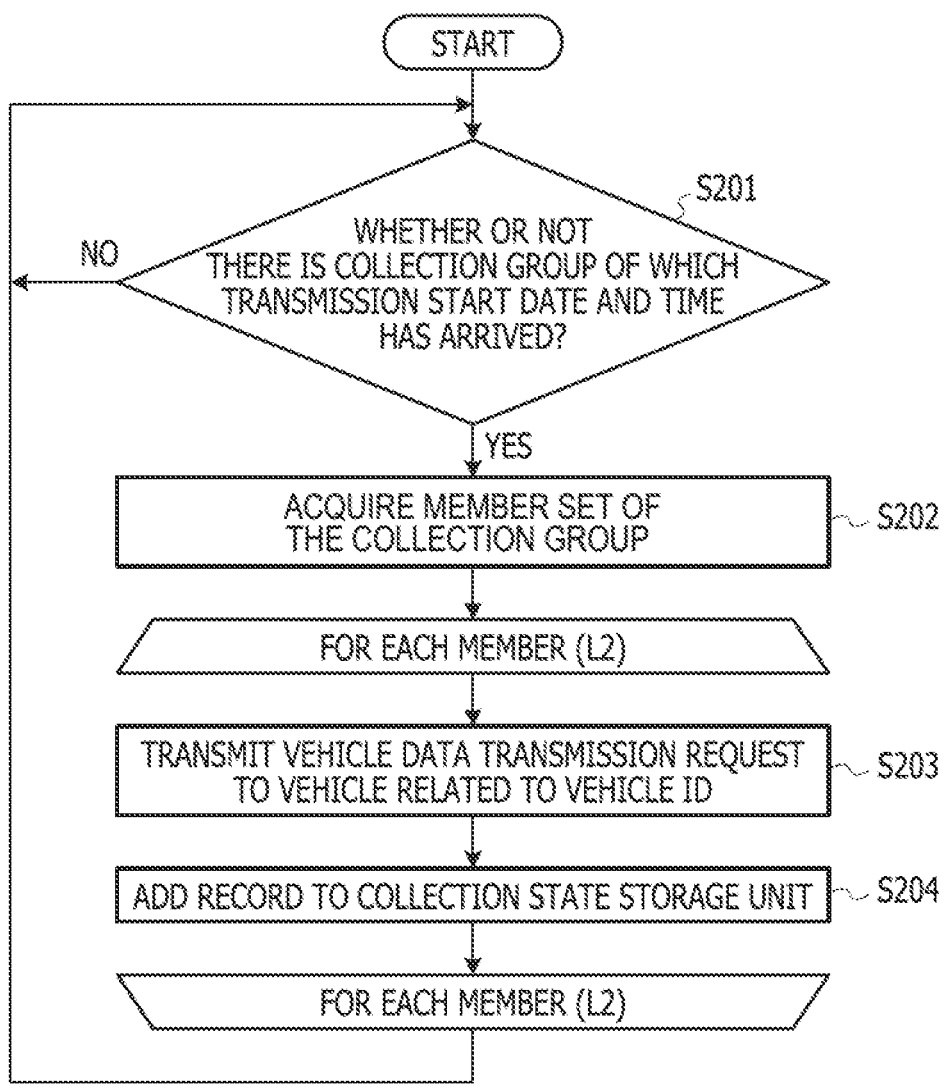
FIG. 10 is a flowchart illustrating an example of a processing procedure of transmission processing of a vehicle data transmission request.

FIG. 10 is a flowchart illustrating an example of a processing procedure of transmission processing of a vehicle data transmission request. The processing procedure in FIG. 10 is executed in parallel to the processing procedure in FIG. 4. Alternatively, the processing procedure in FIG. 10 may be started according to recording of a record in the schedule storage unit 122.

The vehicle data request unit 13, for example, periodically refers to the schedule storage unit 122 and determines whether or not there is a collection group of which a transmission start date and time has arrived (S201). In a case where there is a collection group of which the transmission start date and time has arrived (YES in S201), the vehicle data request unit 13 acquires a member set of the collection group from the schedule storage unit 122 (S202). Subsequently, the vehicle data request unit 13 executes loop processing L2 (S203 and S204) for each collection request included in the member set. The collection request that is a processing target in the loop processing L2 is referred to as a "target request" below.

In step S203, the vehicle data request unit 13 transmits a vehicle data transmission request to a vehicle 30 related to a vehicle ID included in the target request. The transmission request includes a request ID of the target request and a data ID included in the target request.

Subsequently, the vehicle data request unit 13 adds a record corresponding to the target request to the collection state storage unit 124 (S204).

Figure 11:
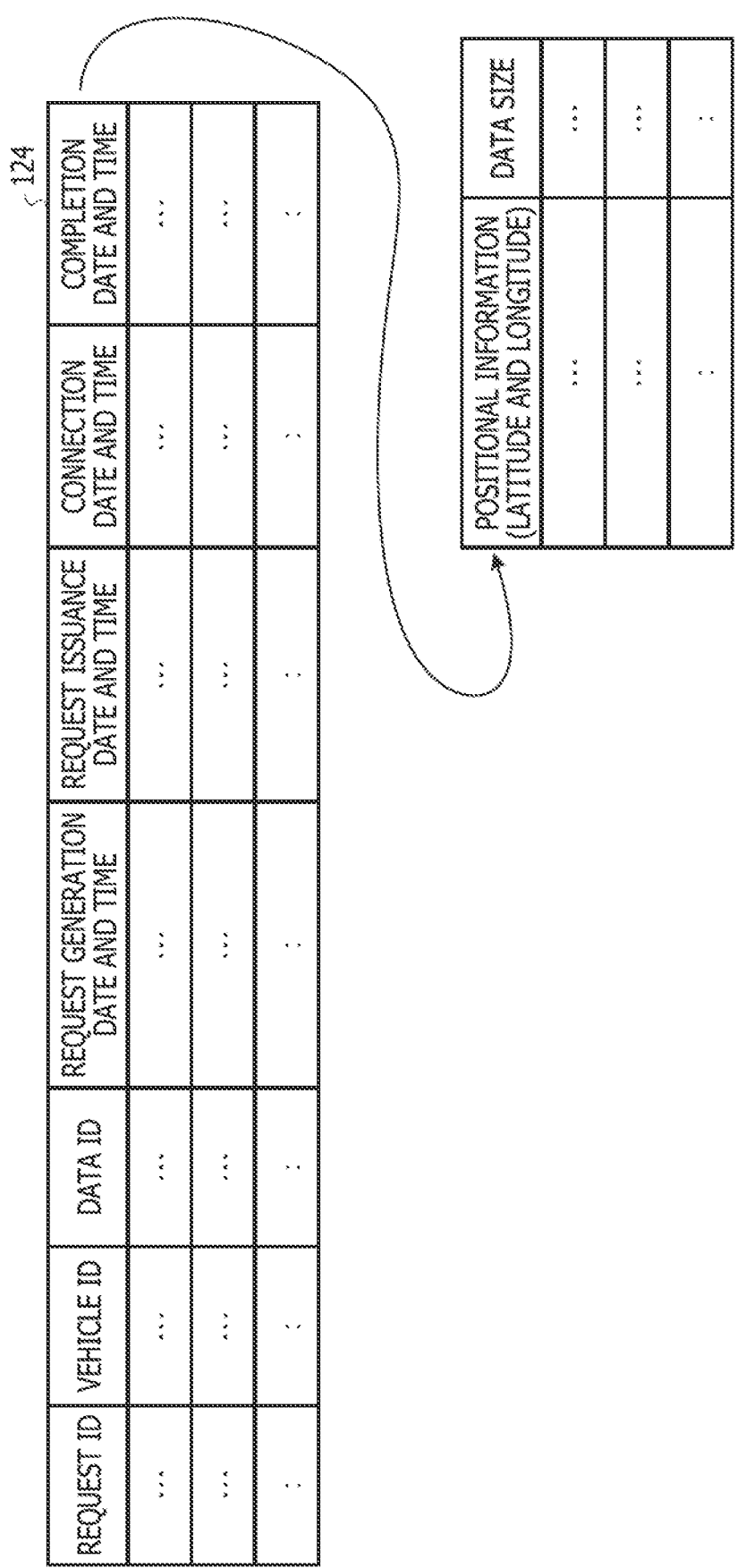
FIG. 11 is a diagram illustrating an exemplary configuration of a collection state storage unit.

FIG. 11 is a diagram illustrating an exemplary configuration of the collection state storage unit 124. As illustrated in FIG. 11, a record of the collection state storage unit 124 includes items of a request ID, a vehicle ID, a data ID, a request generation date and time, a request issuance date and time, a connection date and time, a completion date and time, positional information, a data size, or the like and is generated for each collection request (in other words, for each vehicle data transmission request).

The request ID is a request ID of the collection request. The vehicle ID, the data ID, and the request generation date and time are respectively a vehicle ID, a data ID, and a request generation date and time of the collection request. The request issuance date and time is a date and time when the vehicle data transmission request is transmitted to the vehicle 30 for the collection request. The connection date and time is a date and time when communication connection with a vehicle 30 that is a transmission source of vehicle data is started (date and time when reception of vehicle data is started). The completion date and time is a date and time when reception of the vehicle data from the vehicle 30 is completed. The positional information is positional information of the vehicle 30 at the time when the vehicle data is transmitted. The data size is a data size of data that is actually received from the vehicle 30.

In step S204, the vehicle data request unit 13 adds a new record to the collection state storage unit 124, records the request ID, the vehicle ID, the data ID, and the request generation date and time of the target request in the new record, and records the date and time at the time of step S204 in the new record as the request issuance date and time. Therefore, values of the connection date and time, the completion date and time, the positional information, and the data size of the new record remain empty.

Figure 12:
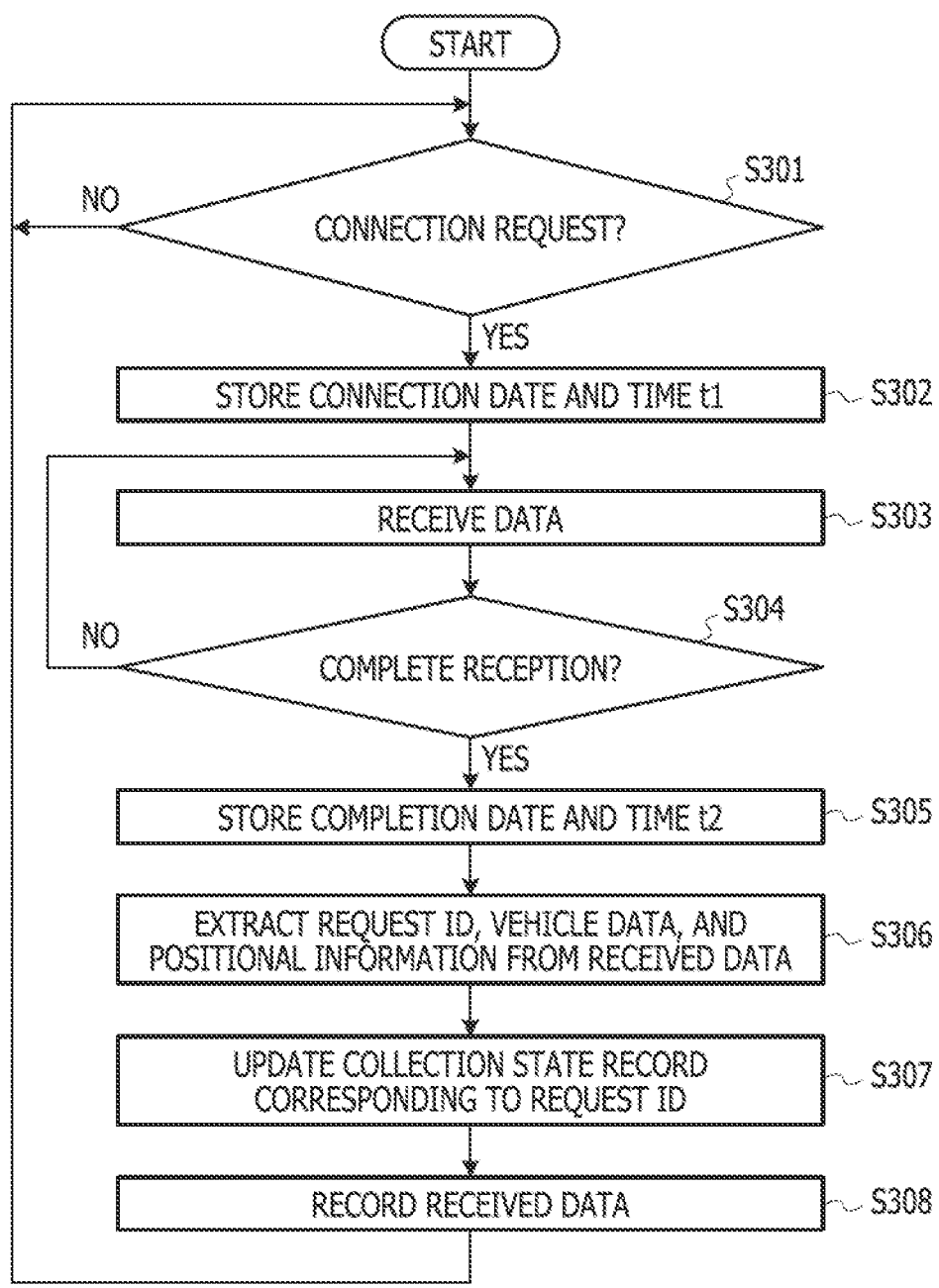
FIG. 12 is a flowchart illustrating an example of a processing procedure of vehicle data reception processing.

FIG. 12 is a flowchart illustrating an example of a processing procedure of vehicle data reception processing. The processing procedure in FIG. 12 is executed in parallel to the processing procedures in FIGS. 4 and 10.

The response reception unit 14 waits for connection of communication from each vehicle 30 to which a vehicle data transmission request has been transmitted by the vehicle data request unit 13 (S301). When receiving a connection request from any one of the vehicles 30 (hereinafter, referred to as "target vehicle 30") (YES in S301), the response reception unit 14 stores a connection date and time t1 in the memory device 103 (S302). Subsequently, the response reception unit 14 receives data transmitted from the target vehicle 30 (S303). When the reception of the data (hereinafter, referred to as "received data") is completed (YES in S304), the response reception unit 14 stores a completion date and time t2 in the memory device 103 (S305). Subsequently, the response reception unit 14 extracts a request ID, vehicle data, and positional information from the received data (S306). In other words, the vehicle 30 that has received the vehicle data transmission request transmits the vehicle data related to the data ID included in the transmission request, the request ID included in the transmission request (hereinafter, referred to as "target request ID"), and the current positional information of the vehicle 30 (hereinafter, referred to as "target positional information") to the data collection device 10.

Subsequently, the response reception unit 14 updates a record including the target request ID among records stored in the collection state storage unit 124 (FIG. 11) (S307). Specifically, for example, the response reception unit 14 records the connection date and time t1, the completion date and time t2, the target positional information, and the data size of the received data respectively in the connection date and time, the completion date and time, the positional information, and the data size of the record.

Subsequently, the response reception unit 14 records the received data in the data storage unit 123 (S308).

Figure 13:
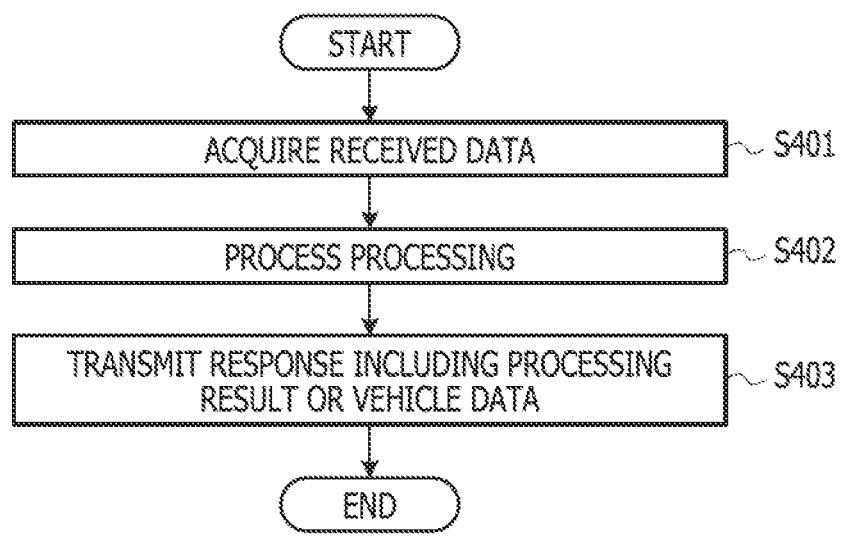
FIG. 13 is a flowchart illustrating an example of a processing procedure of processing for transmitting a response to the collection request.

FIG. 13 is a flowchart illustrating an example of a processing procedure of processing for transmitting a response to the collection request. The processing procedure in FIG. 13 may start, for example, according to recording of the received data in the data storage unit 123.

In step S401, the data processing unit 15 acquires received data from the data storage unit 123. Subsequently, the data processing unit 15 executes predetermined process processing on vehicle data included in the received data (S402). The process processing may be specified in the collection request. Alternatively, it is not needed to execute the process processing. Subsequently, the data processing unit 15 transmits a request ID included in the received data and a response, which includes a processing result of the process processing or the vehicle data, to the service device 20 that is a transmission source of the collection request related to the request ID (S403).

Figure 14:
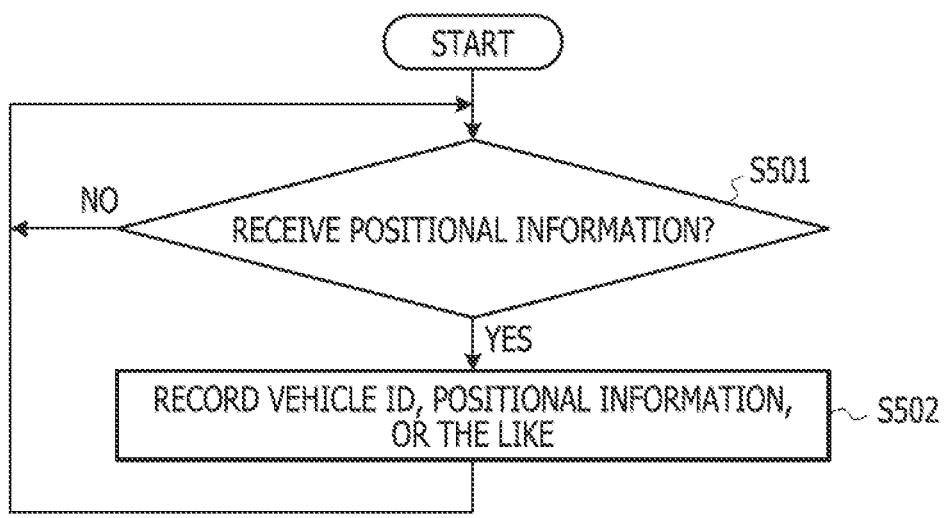
FIG. 14 is a flowchart illustrating an example of a processing procedure of processing for recording positional information of a vehicle.

FIG. 14 is a flowchart illustrating an example of a processing procedure of processing for recording positional information of the vehicle 30.

The positional information reception unit 17 waits for, for example, reception of the positional information periodically transmitted from each vehicle 30 (S501). When receiving positional information of a current position of any vehicle 30 (hereinafter, referred to as "target positional information") and a vehicle ID of the vehicle 30 (hereinafter, referred to as "target vehicle ID") (YES in S501), the positional information reception unit 17 updates a record including the target vehicle ID among the records in the positional information storage unit 126 (FIG. 6) (S502). Specifically, for example, the positional information reception unit 17 records the current date and time and the target positional information respectively in a date and time and positional information of the record. Note that, in a case where there is no corresponding record, the positional information reception unit 17 adds a new record to the positional information storage unit 126 and records the target vehicle ID, the current date and time, and the target positional information in the new record.

Figure 15:
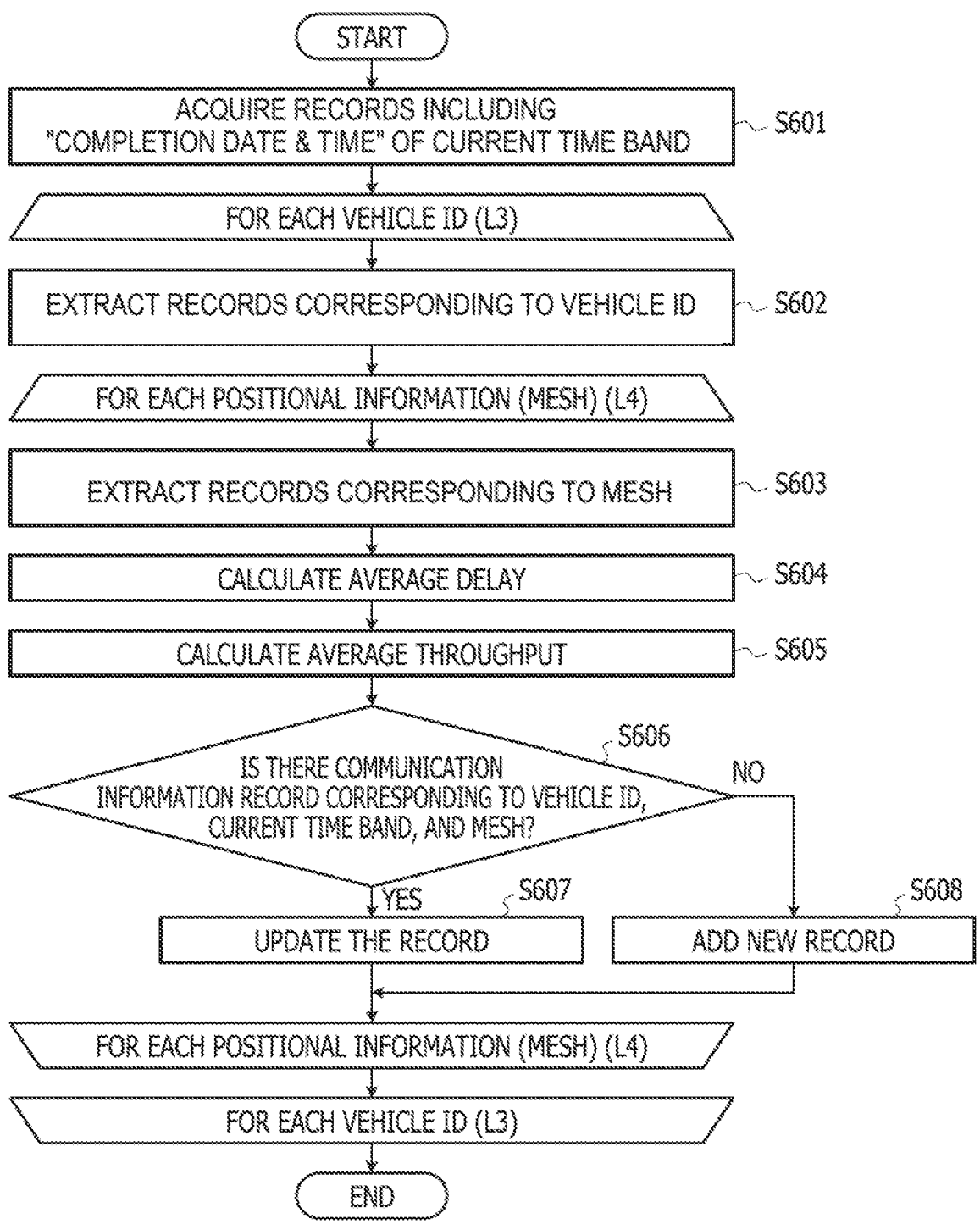
FIG. 15 is a flowchart illustrating an example of a processing procedure of update processing of the communication information storage unit.

FIG. 15 is a flowchart illustrating an example of a processing procedure of update processing of the communication information storage unit 125. For example, FIG. 15 is periodically executed. The flowchart in FIG. 15 is executed, for example, in a unit of the time band included in the communication information store in the communication information storage unit 125 (for example, every hour in a case of one hour unit).

In step S601, the communication information generation unit 16 acquires records including the "completion date and time" that belongs to a time band to which the current date and time belongs from among the records in the collection state storage unit 124 (FIG. 11). Here, the time band is distinguished based on "month" and "day of the week". Therefore, more specifically, the records including the "completion date and time" of which the "month" and the "day of the week" match the current date and the "hour" at the time matches the current time is acquired in step S601.

Subsequently, the communication information generation unit 16 executes loop processing L3, which includes step S602 and loop processing L4, for each vehicle ID included in the records. Hereinafter, the vehicle ID to be processed in the loop processing L3 is referred to as a "target vehicle ID".

In step S602, the communication information generation unit 16 extracts records including the target vehicle ID (hereinafter, referred to as "target vehicle records") from among the records acquired in step S601. Subsequently, the communication information generation unit 16 executes the loop processing L4 for each mesh to which positional information of any record included in the target vehicle records belongs. Hereinafter, the mesh to be processed in the loop processing L4 is referred to as a "target mesh".

In step S603, the communication information generation unit 16 extracts records of which positional information is included in the target mesh (hereinafter, referred to as "target records") from the target vehicle records.

Subsequently, the communication information generation unit 16 calculates ("connection date and time"–"request issuance date and time") for each record included in the target records and calculates an average of the calculation results (in other words, average delay) (S604). Subsequently, the communication information generation unit 16 calculates ("data size"÷ ("completion date and time"−"connection date and time")) for each record included in the target records and calculates an average of the calculation results (in other words, average throughput) (S605).

Subsequently, the communication information generation unit 16 determines whether or not a record, which includes the target vehicle ID, the target mesh, and a current time band, respectively, as the vehicle ID, the positional information, and the time band, is stored in the communication information storage unit 125 (S606). The current time band is a time band to which the current time belongs.

In a case where there is the corresponding record (YES in S606), the communication information generation unit 16 updates the record (S607). Specifically, for example, the communication information generation unit 16 overwrites the "delay" of the record with the average delay calculated in step S604, and overwrites the "throughput" of the record with the average throughput calculated in step S605.

On the other hand, there is no corresponding record (NO in S606), the communication information generation unit 16 adds a new record including the target vehicle ID, the target mesh, the current time band, the average delay calculated in step S604, and the average throughput calculated in step S605 to the communication information storage unit 125 (S608).

As described above, according to the present embodiment, the plurality of collection requests (in other words, plurality of vehicle data transmission requests) are classified into the plurality of groups on the basis of the dispersion of the delays and the dispersion of the throughputs, and the transmission timing to the vehicle 30 is determined in a group unit. Therefore, it is possible to avoid a network congestion. In a case where the vehicle data transmission requests are transmitted at regular intervals without the classification into groups, there is a possibility that a delay of a response from each vehicle 30 (transmission of vehicle data) fluctuates due to a difference between performances of the respective vehicle 30 and a difference between throughputs of lines between the respective vehicles 30 and the data collection device 10 or the like so that the responses from the respective vehicles 30 may be concentrated. According to the present embodiment, because the scheduling is performed in a group unit as described above, such a possibility may be reduced.

Furthermore, by performing the scheduling in a group unit, a calculation scale of an optimization algorithm regarding the scheduling may be reduced than a case where the scheduling is performed in units of the vehicle 30. As a result, it is possible to reduce a load of the data collection device 10, and it is possible to enhance real-time performance of the processing executed by the data collection device 10.

Note that, in the present embodiment, a case has been described where the vehicle 30 that is a moving body is an example of a device. However, the device does not necessarily need to be a moving body. For example, the present embodiment may be applied to a device that is fixedly distributed and installed.

Note that, in the present embodiment, the scheduling unit 12 is an example of an acquisition unit, a classification unit, and a determination unit. The threshold th1 is an example of a first threshold. The threshold th2 is an example of a second threshold.

As one aspect, a network congestion may be avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data collection device, comprising:
a memory; and
a processor coupled to the memory and the processor configured to:
acquire, for a plurality of data transmission requests, first predicted values of a delay from transmission of the respective data transmission requests to a start of reception of data and second predicted values of a throughput regarding the reception of the data;
classify the plurality of data transmission requests into groups based on first dispersion of the first predicted values and second dispersion of the second predicted values; and
determine transmission timings of the respective data transmission requests in a unit of the group.

2. The data collection device according to claim 1, wherein
the processor is further configured to determine the transmission timings such that a needed bandwidth is minimized.

3. The data collection device according to claim 1, wherein
the processor is further configured to classify the plurality of data transmission requests such that the first dispersion regarding the data transmission requests that belong to a same group is equal to or less than a first threshold and the second dispersion regarding the data transmission requests that belong to a same group is equal to or less than a second threshold.

4. A data collection method, comprising:
acquiring by a computer, for a plurality of data transmission requests, first predicted values of a delay from transmission of the respective data transmission requests to a start of reception of data and second predicted values of a throughput regarding the reception of the data;
classifying the plurality of data transmission requests into groups based on first dispersion of the first predicted values and second dispersion of the second predicted values; and
determining transmission timings of the respective data transmission requests in a unit of the group.

5. The data collection method according to claim 4, wherein
the determining is performed such that a needed bandwidth is minimized.

6. The data collection method according to claim 4, wherein
the classifying is performed such that the first dispersion regarding the data transmission requests that belong to a same group is equal to or less than a first threshold and the second dispersion regarding the data transmission requests that belong to a same group is equal to or less than a second threshold.

7. A non-transitory computer-readable recording medium having stored therein a program that causes a computer to execute a process, the process comprising:

acquiring, for a plurality of data transmission requests, first predicted values of a delay from transmission of the respective data transmission requests to a start of reception of data and second predicted values of a throughput regarding the reception of the data;

classifying the plurality of data transmission requests into groups based on first dispersion of the first predicted values and second dispersion of the second predicted values; and determining transmission timings of the respective data transmission requests in a unit of the group.

8. The non-transitory computer-readable recording medium according to claim 7, wherein the determining is performed such that a needed bandwidth is minimized.

9. The non-transitory computer-readable recording medium according to claim 7, wherein the classifying is performed such that the first dispersion regarding the data transmission requests that belong to a same group is equal to or less than a first threshold and the second dispersion regarding the data transmission requests that belong to a same group is equal to or less than a second threshold.

\* \* \* \* \*